(12) United States Patent
Kanagawa et al.

(10) Patent No.: US 10,135,300 B2
(45) Date of Patent: Nov. 20, 2018

(54) NON-CONTACT POWER RECEPTION APPARATUS

(71) Applicant: TOSHIBA TEC KABUSHIKI KAISHA, Shinagawa-ku, Tokyo (JP)

(72) Inventors: Masahiro Kanagawa, Kobe Hyogo (JP); Masakazu Kato, Numazu Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 41 days.

(21) Appl. No.: 15/286,694

(22) Filed: Oct. 6, 2016

(65) Prior Publication Data

US 2017/0207662 A1    Jul. 20, 2017

(30) Foreign Application Priority Data

Jan. 19, 2016   (JP) .................. 2016-007539

(51) Int. Cl.
| | |
|---|---|
| *H02J 50/12* | (2016.01) |
| *H02M 1/12* | (2006.01) |
| *H02M 7/06* | (2006.01) |
| *H02M 1/44* | (2007.01) |
| *H02M 3/28* | (2006.01) |
| *H02M 1/00* | (2006.01) |

(52) U.S. Cl.
CPC ............ *H02J 50/12* (2016.02); *H02M 1/126* (2013.01); *H02M 1/44* (2013.01); *H02M 3/28* (2013.01); *H02M 7/06* (2013.01); *H02M 2001/0058* (2013.01); *H02M 2001/123* (2013.01); *Y02B 70/1491* (2013.01)

(58) Field of Classification Search
CPC . H02J 5/005; H02J 7/025; H02J 17/00; B60L 11/182; H02M 3/22–3/44
See application file for complete search history.

(56) References Cited

U.S. PATENT DOCUMENTS

| | | | | |
|---|---|---|---|---|
| 2004/0239465 | A1* | 12/2004 | Chen | H01F 17/00 336/173 |
| 2004/0246749 | A1* | 12/2004 | Odell | H01F 27/34 363/21.12 |
| 2005/0201126 | A1* | 9/2005 | Uchida | H02M 3/335 363/21.15 |

(Continued)

*Primary Examiner* — Rexford Barnie
*Assistant Examiner* — David Shiao
(74) *Attorney, Agent, or Firm* — Amin, Turocy & Watson LLP (57) ABSTRACT

A non-contact power reception apparatus comprises a power reception coil which receives AC power supplied from a power transmission apparatus in a non-contact manner; a diode full-wave rectifier circuit which inputs AC power from a resonance circuit to first and second input ends and outputs DC power between an output end and a reference potential end; a common mode filter which comprises first and second coils wound around a common magnetic body in parallel in the same direction for only the same number of turns, connects one end of the first coil with the output end of the diode full-wave rectifier circuit and connects one end of the second coil with the reference potential end; a smoothing capacitor connected between the other end of the first coil of the common mode filter and the other end of the second coil; and a load connected with the smoothing capacitor in parallel.

15 Claims, 8 Drawing Sheets

(56) References Cited

U.S. PATENT DOCUMENTS

| | | | |
|---|---|---|---|
| 2012/0236611 A1* | 9/2012 | Alexandrov | H02M 7/155 363/126 |
| 2013/0077360 A1 | 3/2013 | Low et al. | |
| 2013/0242623 A1* | 9/2013 | Wei | H02M 5/458 363/37 |
| 2013/0320753 A1* | 12/2013 | Kim | H01F 19/08 307/1 |
| 2016/0094046 A1 | 3/2016 | Kato | |
| 2016/0204707 A1* | 7/2016 | Takahara | H02M 1/4258 363/16 |
| 2017/0346343 A1* | 11/2017 | Atasoy | H02J 50/12 |

* cited by examiner

NON-CONTACT POWER RECEPTION APPARATUS

CROSS-REFERENCE TO RELATED APPLICATION

This application is based upon and claims the benefit of priority from Japanese Patent Application No. P2016-007539, filed Jan. 19, 2016, the entire contents of which are incorporated herein by reference.

FIELD

Embodiments described herein relate generally to a non-contact power reception apparatus for receiving power from a power transmission apparatus in a non-contact manner.

BACKGROUND

In recent years, a non-contact power supply system for supplying power in a non-contact manner is being popular. The non-contact power supply system uses electromagnetic coupling such as electromagnetic induction or magnetic field resonance to supply power to a power reception apparatus such as a portable terminal, a tablet terminal and the like in a non-contact manner. In general, the non-contact power supply system is composed of a power transmission apparatus and a power reception apparatus, and in the power transmission apparatus, a power transmission coil and a power transmission circuit for supplying power are included. On the other hand, in the power reception apparatus, a power reception coil for receiving power from the power transmission apparatus in a non-contact manner, a voltage conversion circuit for using the received power for drive of the power reception apparatus itself, and a charging circuit for charging a secondary battery carried in the power reception apparatus itself are included.

It is necessary that the non-contact power supply system increases Q values of the power transmission coil and the power reception coil in order to be capable of supplying power to the power reception apparatus even if the power transmission apparatus is separated from the power reception apparatus by 1-2 cm or more. Thus, a frequency of a few MHz or more (for example, 6.78 MHz or 13.56 MHz) capable of increasing the Q values of the coils is used as a frequency of AC power output by the power transmission apparatus. If the Q values of the coils are increased, even if a distance between the power transmission coil and the power reception coil is large, characteristics capable of efficiently supplying power are obtained.

The power reception apparatus constitutes a LC resonance circuit with the power reception coil and a resonance capacitor, and can efficiently receive the AC power output by the power transmission apparatus by being designed to reduce impedance of the LC resonance circuit. The AC power supplied to the power reception apparatus is converted to DC power through a rectifier circuit. The power to which the DC conversion is carried out through the rectifier circuit is used by being converted to a voltage required for the drive of the power reception apparatus itself through the voltage conversion circuit.

Incidentally, as the rectifier circuit, in general, a diode full-wave rectifier circuit is used; however, harmonic noise is generated from the diode full-wave rectifier circuit as junction capacitance Cj is included in a diode. In other words, an equivalent circuit at the time a reverse voltage is applied to a diode can be simulated as a configuration in which resistance of a fraction of Ω and junction capacitance Cj (capacitor) of dozens of pF are connected in series.

Thus, immediately after a switching point at which the reverse voltage is applied to the diode from a state in which a forward voltage is applied thereto, the junction capacitance Cj of the diode is rapidly charged, and a large current flows in a short time to generate the harmonic noise. The generated harmonic noise is radiated from the power reception coil of the power reception apparatus.

In the non-contact power supply system which can supply the power to the power reception apparatus even if the power transmission coil is separated from the power reception coil by a few cm, as the power reception coil and the power transmission coil are not closely combined, an electromagnetic wave including the harmonic noise is easily radiated from the power reception coil to a space. Therefore, it is necessary to reduce the harmonic noise generated from the diode full-wave rectifier circuit in order to reduce the electromagnetic wave including the harmonic noise output from the power reception coil.

As an example of a countermeasure of the harmonic noise of the power reception apparatus, a wireless power reception apparatus disclosed in Japanese Translation of PCT International Application Publication No. JP-T-2014-530592 is known. The power reception apparatus disclosed in Japanese Translation of POT International Application Publication No. JP-T-2014-530592 arranges a band-stop filter circuit between the diode full-wave rectifier circuit and a smoothing capacitor to electrically insulate radiation from a rectifier.

However, it is difficult that the capacitor of the band-stop filter circuit carries out the same work as the junction capacitance Cj of the diode of the rectifier and reduces the harmonic noise. Further, in a case of reducing the capacitor of the band-stop filter circuit to the utmost and constituting the capacitor of the band-stop filter circuit with only an inductor, a large inductor is required for noise reduction. Thus, a sufficient current cannot be supplied to a load circuit, and as a result, output power of the power reception apparatus falls.

DETAILED DESCRIPTION

In accordance with an embodiment, a non-contact power reception apparatus comprises a power reception coil configured to receive AC power supplied from a power transmission apparatus in a non-contact manner; a resonance circuit configured to comprise the power reception coil and a capacitor for resonance and resonate at a frequency of the AC power; a diode full-wave rectifier circuit configured to input AC power from the resonance circuit to first and second input ends and output DC power between an output end and a reference potential end; a common mode filter configured to comprise a first coil and a second coil wound around a common magnetic body in parallel in the same direction for only the same number of turns, connect one end of the first coil with the output end of the diode full-wave rectifier circuit and connect one end of the second coil with the reference potential end; a smoothing capacitor connected between the other end of the first coil of the common mode filter and the other end of the second coil; and a load connected with the smoothing capacitor in parallel.

Hereinafter, embodiments for executing the invention are described with reference to the accompanying drawings. Further, the same reference numerals are applied to the same elements in each figure.

First Embodiment

Figure 1:
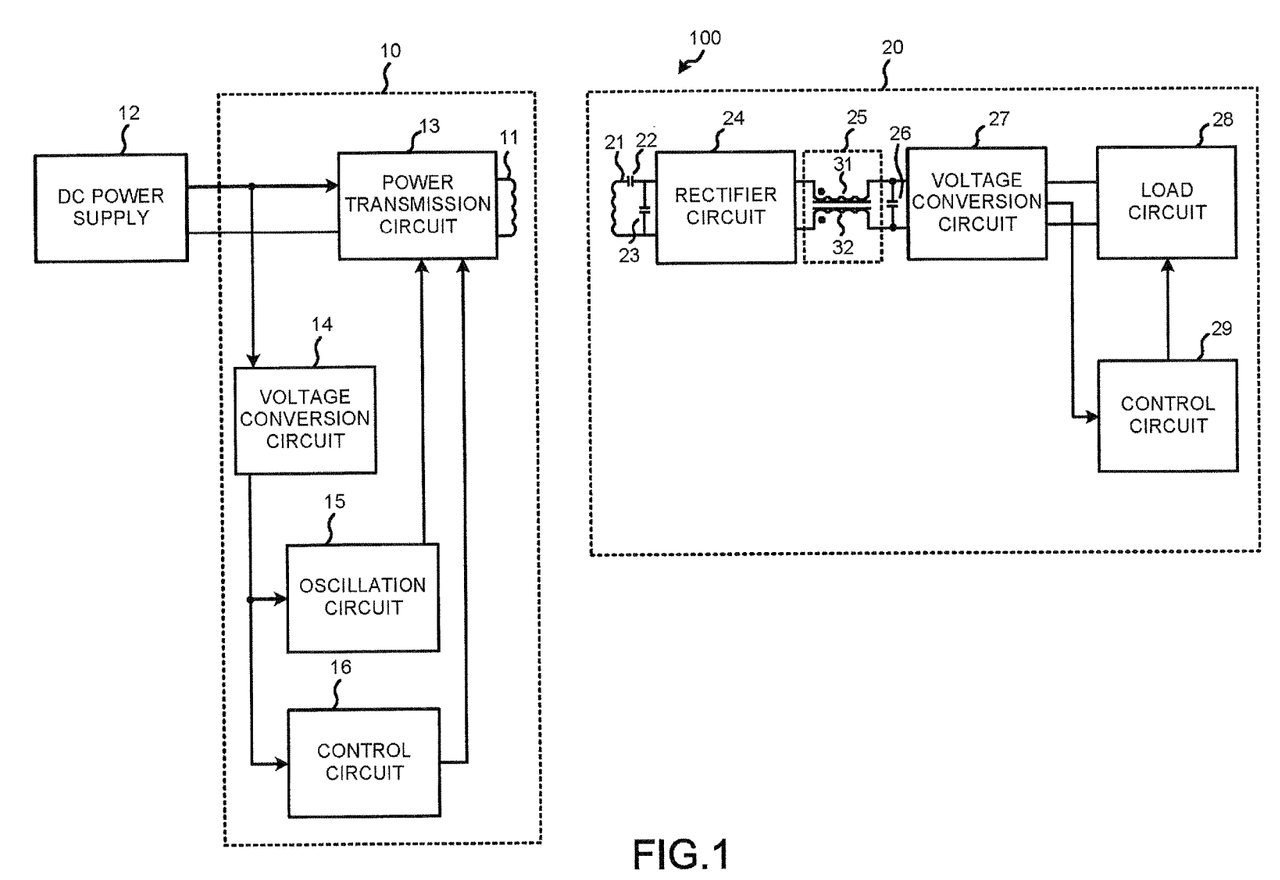
FIG. 1 is a block diagram illustrating the configuration of a non-contact power supply system according to a first embodiment.

FIG. 1 is a block diagram illustrating a power supply system 100 including a non-contact power reception apparatus according to the embodiment. The power supply system 100 includes a power transmission apparatus 10 for supplying power and a power reception apparatus 20 for receiving the supplied power in a non-contact manner.

The power transmission apparatus 10 includes a power transmission coil 11, and the power reception apparatus 20 includes a power reception coil 21. The power output from the power transmission apparatus 10 is supplied to the power reception apparatus 20 with electromagnetic coupling such as electromagnetic induction or magnetic field resonance between the power transmission coil 11 and the power reception coil 21.

DC power from a DC power supply 12 such as an AC adapter is supplied to the power transmission apparatus 10. The power transmission apparatus 10 includes a power transmission circuit 13 for generating high frequency power, the power transmission coil 11, a voltage conversion circuit 14, an oscillation circuit 15 and a control circuit 16.

The power transmission circuit 13 converts a direct current to a high frequency alternating current and outputs the high frequency alternating current, and thus is constituted by a class-E amplifier or a switching circuit of a half bridge system or a full bridge system. The power transmission circuit 13 carries out zero voltage switching (ZVS) or zero current switching (ZCS) to carry out soft switching.

The soft switching carries out switching of on/off of a switching element with a resonance phenomenon at a timing at which a voltage or a current becomes zero. Switching loss can be reduced through the zero voltage switching (ZVS) or the zero current switching (ZCS). Further, as change in a voltage waveform or a current waveform is gradual, it is possible to reduce switching noise or conduction noise and radiation noise.

The voltage conversion circuit 14 converts a voltage input from the DC power supply 12 to a suitable voltage at which the oscillation circuit 15 and the control circuit 16 can operate. For example, output voltage 24 V of the DC power supply 12 is converted to a voltage of 5 V or 3.3 V through the voltage conversion circuit 14.

The oscillation circuit 15 generates a drive signal for controlling the switching element of the power transmission circuit 13. An oscillation frequency of the oscillation circuit 15 is identical or almost identical to a self-resonant frequency of a resonance circuit composed of the power transmission coil 11 and a capacitor. The oscillation frequency of the oscillation circuit 15, that is, a switching frequency of the power transmission circuit 13 adopts a switching frequency of a few MHz to ten-odd MHz from the point of ensuring a distance between the power transmission coil 11 and the power reception coil 21 to 1-2 cm or more. Specifically, the oscillation frequency adopts a frequency of 6.78 MHz or 13.56 MHz.

If the distance between the power transmission coil 11 and the power reception coil 21 is close to about a few mm, it is possible to apply the configuration of the present embodiment even to a frequency of a few tens of kHz to a few hundreds of kHz. However, a value of a capacitor or an inductance value of a coil used in the switching circuit of the power transmission circuit 13 matches the frequency, and thus adjustment of the value is required.

The control circuit 16 is a microcomputer including a CPU. The control circuit 16 carries out drive control for enabling the power transmission circuit 13 to operate or stop as necessary and communication control with the power reception apparatus 20.

The power reception apparatus 20 includes a resonance circuit composed of the power reception coil 21 and capacitors 22 and 23, a diode full-wave rectifier circuit 24, a common mode filter 25, a smoothing capacitor 26, a voltage conversion circuit 27, a load circuit 28 and a control circuit 29.

An alternating voltage sent from the resonance circuit by the power reception coil 21 and the capacitors 22 and 23 is converted to a direct voltage through the diode full-wave rectifier circuit 24, and then, the direct voltage is smoothed by the common mode filter 25 and the smoothing capacitor 26. The voltage conversion circuit 27 converts the direct voltage smoothed by the common mode filter 25 and the smoothing capacitor 26 to a suitable voltage at which the control circuit 29 and the load circuit 28 can operate. For example, the smoothed direct voltage of about 40 V is converted to 24 V by the voltage conversion circuit 27 to be supplied to the load circuit 28, and further converted to 5 V to be supplied to the control circuit 29.

The load circuit 28 is a circuit of an electronic device such as a portable terminal, a tablet terminal and the like, and the power received by the power reception apparatus 20 is used for operations of the electronic device, charging of a battery built in the electronic device and the like. The control circuit 29 which is a microcomputer including a CPU carries out drive control for supplying the received power to the load circuit 28 or stopping the supply of the received power as necessary and communication control with the power transmission apparatus 10.

Figure 2:
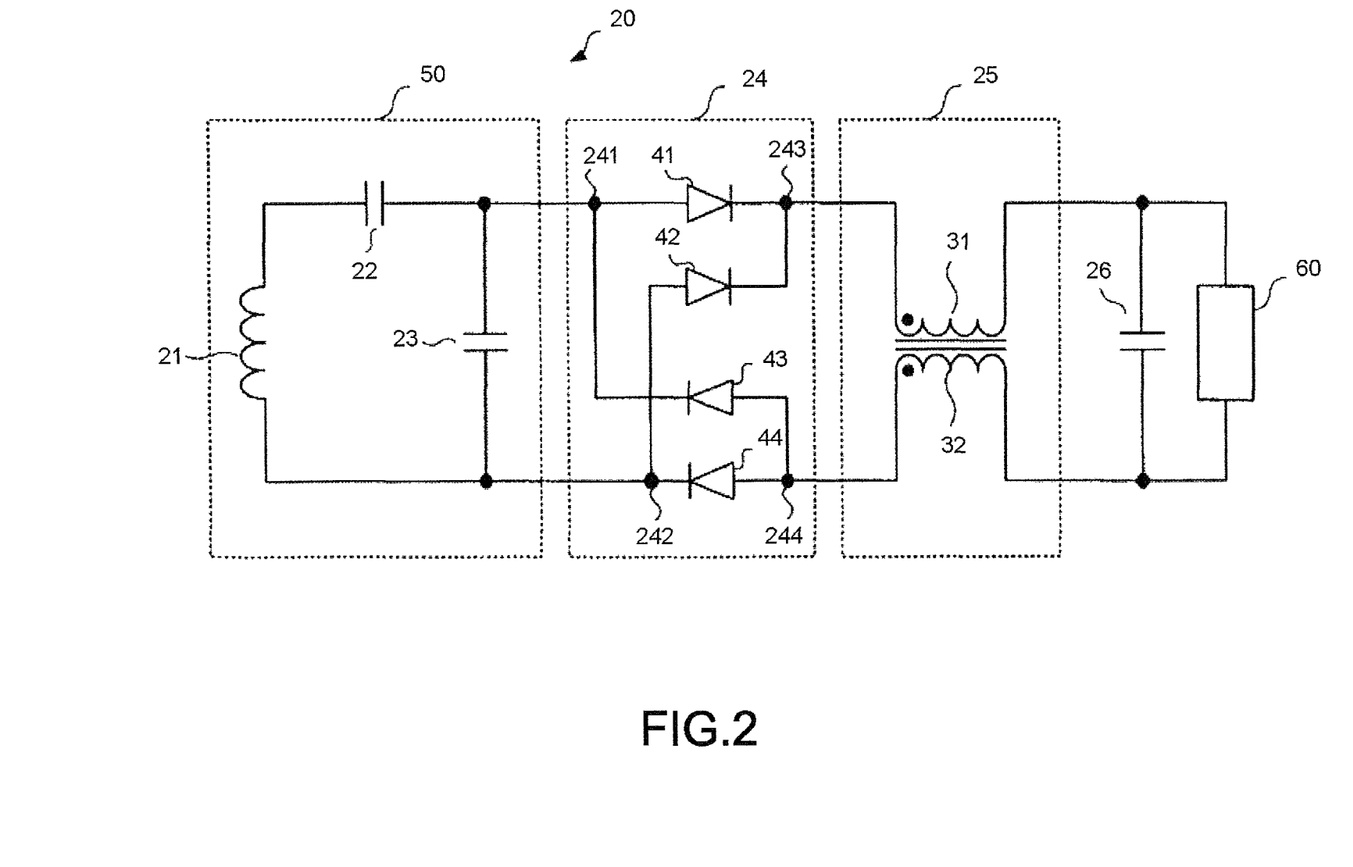
FIG. 2 is a circuit diagram illustrating the configuration of a non-contact power reception apparatus according to the first embodiment.

FIG. 2 is a circuit diagram illustrating the concrete configuration of the non-contact power reception apparatus 20. In FIG. 2, the power reception apparatus 20 includes a resonance circuit 50 composed of the power reception coil 21 and the capacitors 22 and 23, and the diode full-wave rectifier circuit 24 at the output side of the resonance circuit 50 which is connected with both ends of the capacitor 23.

The diode full-wave rectifier circuit 24 composed of diodes 41-44 connects anode of the diode 41 and cathode of the diode 43 with one input end 241 of the diode full-wave rectifier circuit 24, and connects anode of the diode 42 and cathode of the diode 44 with the other input end 242. An output end 243 of the diode full-wave rectifier circuit 24 is connected with one end of the smoothing capacitor 26 via a primary coil 31 of the common mode filter 25, and a reference potential end (ground end) 244 of the diode full-wave rectifier circuit 24 is connected with the other end of the smoothing capacitor 26 via a secondary coil 32 of the common mode filter 25. A load 60 is connected with both ends of the smoothing capacitor 26 in parallel. The load 60 includes the voltage conversion circuit 27, the load circuit 28 and the control circuit 29 shown in FIG. 1.

Figure 3:
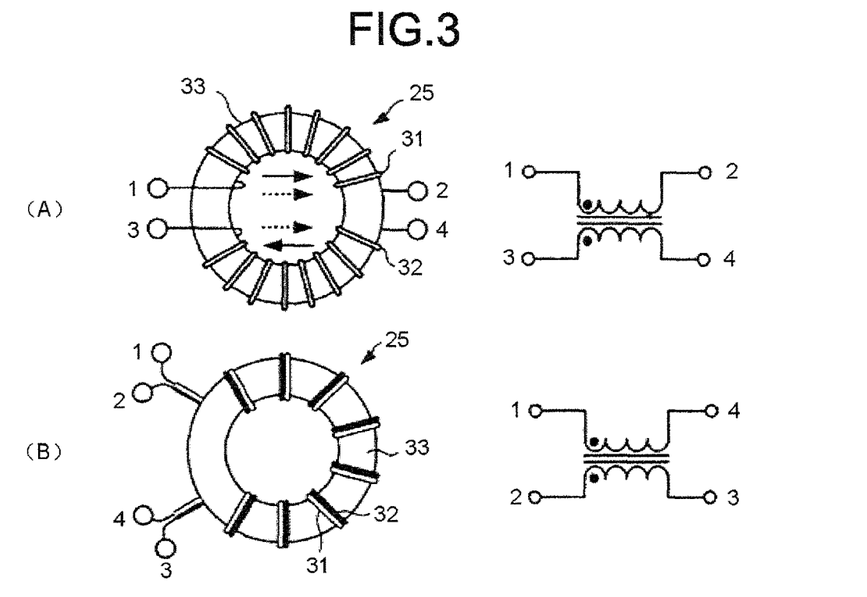
FIG. 3 is a configuration diagram schematically illustrating a common mode filter used in the non-contact power reception apparatus according to the first embodiment.

The common mode filter 25 has a split winding and a bifilar winding as schematically exemplified in FIGS. 3 (A) and (B). In FIGS. 3 (A) and (B), windings of coils are shown at the left side, equivalent circuits are shown at the right side, and terminals of each coil are indicated by numbers 1-4.

The split winding refers to separately winding two lines on the outer periphery of a core 33, that is, winding the primary coil 31 and the secondary coil 32 for only the same number of turns as shown in FIG. 3 (A). The bifilar winding refers to winding two parallel lines on the outer periphery of the core 33 as it is, that is, winding the primary coil 31 and the secondary coil 32 for only the same number of turns as shown in FIG. 3 (B).

The common mode filter 25 operates in a differential mode in which currents (indicated by solid lines) flow to the coil 31 and the coil 32 in mutually opposite directions and in a common mode in which currents (indicated by dotted lines) flow to the coil 31 and the coil 32 in the same direction as exemplified in FIG. 3 (A).

The self-resonant frequency of the resonance circuit 50 composed of the power reception coil 21 and the capacitors 22 and 23 is identical or almost identical to the frequency of the high frequency power radiated from the power transmission coil 11 of the power transmission apparatus 10. In other words, the self-resonant frequency and the frequency of the high frequency power are, for example, 6.78 MHz. The power is efficiently transmitted from the power transmission side to the power receiving side in a non-contact manner by electromagnetically coupling the power transmission coil 11 of the power transmission device 10 and the power reception coil 21 of the power reception apparatus 20 with each other.

In a positive cycle of the AC power received by the power reception coil 21 in FIG. 2, the power reception coil 21 and the capacitors 22 and 23 resonate, and thus the current flows. The current flows from the input end 241 of the diode full-wave rectifier circuit 24 to the diode 41 and the primary coil 31 of the common mode filter 25, flows into the smoothing capacitor 26 and the load 60 and returns to the power reception coil 21 and the capacitor 23 after flowing towards the secondary coil 32 of the common mode filter 25 and the diode 44.

In a negative cycle of the AC power received by the power reception coil 21, the power reception coil 21 and the capacitors 22 and 23 resonate, and thus the current flows. The current flows from the input end 242 of the diode full-wave rectifier circuit 24 to the diode 42 and the primary coil 31 of the common mode filter 25, flows into the smoothing capacitor 26 and the load 60 and returns to the capacitors 22 and 23 and the power reception coil 21 after flowing through the secondary coil 32 of the common mode filter 25 and the diode 43.

As shown in FIG. 3, in the differential mode in which the directions of the currents flowing to the primary coil 31 and the secondary coil 32 are opposite, impedance of the common mode filter 25 is low at a specific frequency, and the current easily flows. Further, in most cases, harmonic noise is transmitted to a wiring (power line or ground line) connected with the load 60 to go round to a signal line as common mode noise, and the currents flow to the primary coil 31 and the secondary coil 32 in the same direction. However, in the common mode, as impedance of the common mode filter 25 is sufficiently high, the common mode noise can be suppressed.

Figure 4:
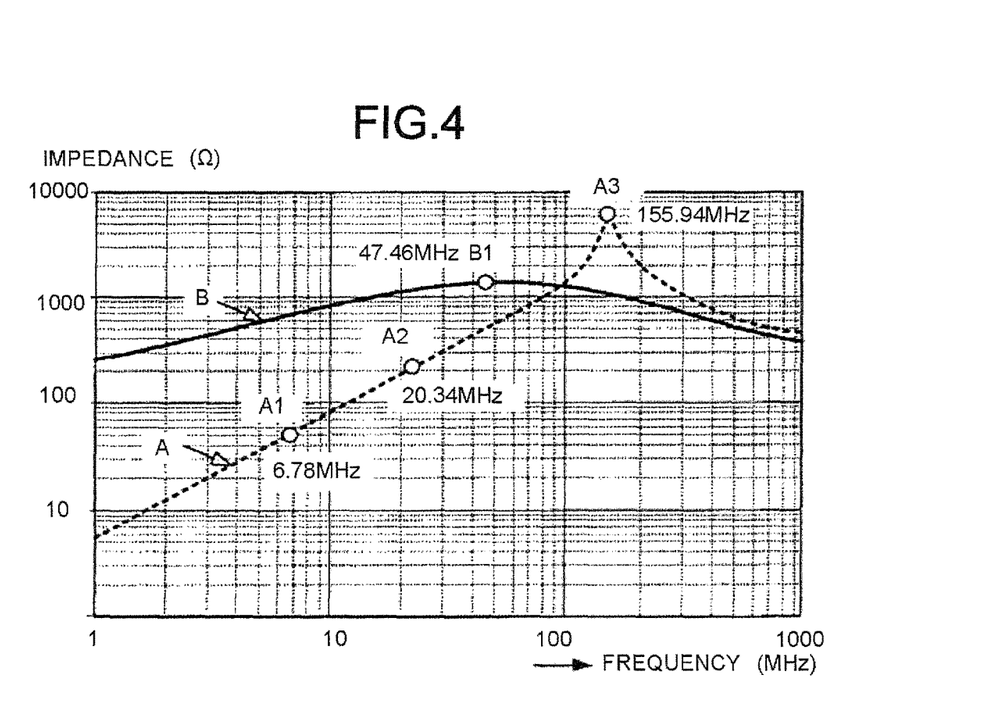
FIG. 4 is a characteristic diagram illustrating impedance and frequency characteristics of the common mode filter used in the non-contact power reception apparatus according to the first embodiment.

FIG. 4 is a characteristic diagram illustrating impedance and frequency characteristics of the common mode filter 25 connected with the latter part of the diode full-wave rectifier circuit 24. In FIG. 4, the horizontal axis represents the frequency, the vertical axis represents the impedance, a characteristic A indicates the impedance in the differential mode, and a characteristic B indicates the impedance in the common mode.

In FIG. 4, a point A1 on the characteristic A indicates the impedance in the differential mode at a fundamental frequency 6.78 MHz. A point A2 indicates the impedance in the differential mode at a frequency 20.34 MHz (3 times as many as the fundamental frequency). A point A3 indicates the impedance in the differential mode at a frequency 155.94 MHz (23 times as many as the fundamental frequency). Further, a point B1 on the characteristic B indicates the impedance in the common mode at a frequency 47.46 MHz (7 times as many as the fundamental frequency).

The impedance in the differential mode suppresses a signal current, and the impedance in the common mode suppresses the common mode noise as behaviors of the common mode filter 25. Further, the common mode filter has an effect of cancelling a magnetic field generated by a current of a differential signal of the harmonic noise.

In a case in which the AC power is 6.78 MHz, an output voltage of the diode full-wave rectifier circuit 24 becomes a voltage waveform of 6.78 MHz. As the impedance (A1) in the differential mode at the frequency 6.78 MHz is as low as about 50Ω, the current almost passes through the common mode filter 25 without being suppressed. On the other hand, as the impedance (A2) in the differential mode at the tertiary harmonic wave (20.34 MHz) of 6.78 MHz is high to about 210Ω, the harmonic noise can be suppressed. An effect of reduction in the harmonic noise is also obtained by cancelling magnetic fluxes in the common mode filter 25. Furthermore, as the impedance (A3) in the differential mode at the twenty-third harmonic wave (155.94 MHz) of 6.78 MHz is high to about 5500Ω, the effect of suppression of the harmonic noise is further increased.

In a case in which the harmonic noise is not completely suppressed and an electromagnetic wave including the harmonic noise is radiated from the power reception coil 21, there is a case in which the harmonic noise is transmitted to the wiring (power line or ground line) connected with the load 60 to go round to the signal line. Thus, there is a possibility that the harmonic noise appears as the common mode noise. However, as shown by the characteristic B in FIG. 4, the impedance in the common mode of the common mode filter 25 is sufficiently high in a full frequency band, and thus can suppress the common mode noise.

Figure 5:
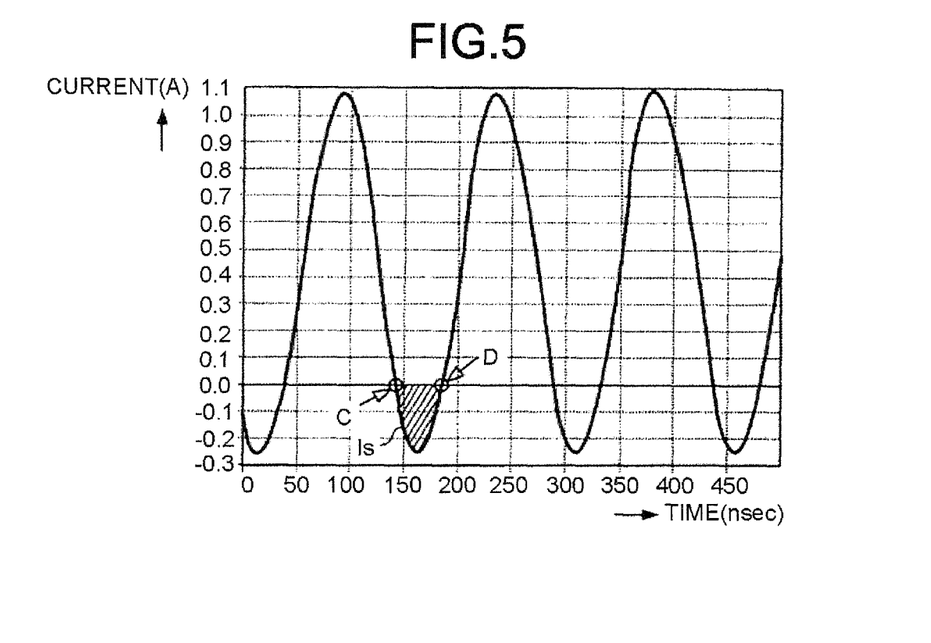
FIG. 5 is a simulation waveform diagram of a conduction current of a diode full-wave rectifier circuit used in the non-contact power reception apparatus according to the first embodiment.

Next, power reception operations of the power reception apparatus 20 are described in detail. FIG. 5 illustrates a simulation waveform of a conduction current of the diode 41 used in the diode full-wave rectifier circuit 24. In FIG. 5, the horizontal axis represents the time, and the vertical axis represents the current. The frequency of the AC power received by the power reception coil 21 is 6.78 MHz.

In FIG. 5, a point C is a point of switching from a state in which the conduction current of the diode 41 flows from the anode to the cathode to a state in which the conduction current flows from the cathode to the anode. A point D is a point of switching from a state in which the conduction current of the diode 41 flows from the cathode to the anode to a state in which the conduction current flows from the anode to the cathode.

In the positive cycle of the AC power received by the power reception coil 21, as stated above, the power reception coil 21 and the capacitors 22 and 23 resonate, and thus the current flows. The current flows into the smoothing capacitor 26 and the load 60 via the diode 41 and the primary coil 31 of the common mode filter 25. Furthermore, the current returns to the power reception coil 21 and the capacitor 23 after flowing through the secondary coil 32 of the common mode filter 25 and the diode 44.

On the other hand, at a timing at which the AC power received by the power reception coil 21 changes from the positive cycle to the negative cycle (at the point C in FIG. 5), the current flows from the cathode of the diode 41 to the anode. A summary of the conduction current of the power reception apparatus 20 at this state is described.

In general, the current does not flow from the cathode of the diode to the anode; however, as an equivalent circuit at the time a reverse voltage is applied to the diode has a configuration in which resistance and junction capacitance Cj are connected in series, there is a characteristic that the current flows from the cathode to the anode to an extent only corresponding to the junction capacitance Cj of the diode 41 in the case of rectifying the AC power of the high frequency.

Thus, at the timing at which the AC power changes from the positive cycle to the negative cycle, the power reception coil 21 and the capacitors 22 and 23 resonate, and thus the current flows. The current flows into the smoothing capacitor 26 and the load 60 via the diode 44 and the secondary coil 32 of the common mode filter 25. Furthermore, the current returns to the power reception coil 21 via the capacitors 22 and 23 after flowing through the primary coil 31 of the common mode filter 25 and the diode 41.

The time of flow from the cathode of the diode 41 to the anode is short in actual, and is influenced by the size of the junction capacitance Cj of the diode 41. If the junction capacitance Cj is large, the conduction time of the current flowing from the cathode to the anode becomes long, and if the junction capacitance Cj is small, the conduction time of the current becomes short. Therefore, a diode of which junction capacitance Cj is small without restriction is ideal for the reduction in the harmonic noise.

In the embodiment, through the common mode filter 25 arranged in series with the diode 41, a peak current of the conduction current flowing from the cathode to the anode is suppressed and becomes a current waveform close to a sine wave. Thus, it becomes difficult for a harmonic component to overlap with the current waveform, and the effect of the reduction in the generation of the harmonic noise is obtained.

In other words, as shown in FIG. 5, a conduction current (Is) during a period (point C→D) during which the current flows from the cathode of the diode 41 to the anode is suppressed by the impedance of the common mode filter 25, a current of 0.26 A flows in 43 ns and becomes a waveform close to a sine wave to flow. Therefore, the current becomes a waveform with less harmonic noise.

In the negative cycle of the AC power received by the power reception coil 21, as stated above, the power reception coil 21 and the capacitors 22 and 23 resonate, and thus the current flows. The current flows through the diode 42 and the primary coil 31 of the common mode filter 25, and flows into the smoothing capacitor 26 and the load 60. Furthermore, the current returns to the capacitors 22 and 23 and the power reception coil 21 after flowing through the secondary coil 32 of the common mode filter 25 and the diode 43.

Further, at the timing at which the AC power received by the power reception coil 21 is switched from the negative cycle to the positive cycle (at the point D in FIG. 5), the current flows from the cathode of the diode 42 to the anode. At this time, the power reception coil 21 receives the AC power and resonates with the capacitors 22 and 23, and thus the AC current flows. The AC current flows into the smoothing capacitor 26 and the load 60 via the diode 43 and the secondary coil 32 of the common mode filter 25. Furthermore, the AC current returns to the power reception coil 21 via the capacitors 22 and 23 after flowing through the primary coil 31 of the common mode filter 25 and the diode 42.

At the timing at which the AC power is switched from the negative cycle to the positive cycle, through the common mode filter 25 arranged in series with the diode 42, the conduction current flowing from the cathode of the diode 42 to the anode is suppressed.

In FIG. 5, the current flowing from the cathode to the anode by the junction capacitance Cj of the diode 41 is described; however, even as to other diodes 42, 43 and 44, when the current flows from the cathode to the anode, through the common mode filter 25, the peak current of the conduction current flowing from the cathode to the anode is suppressed and becomes the current waveform close to the sine wave.

Figure 6:
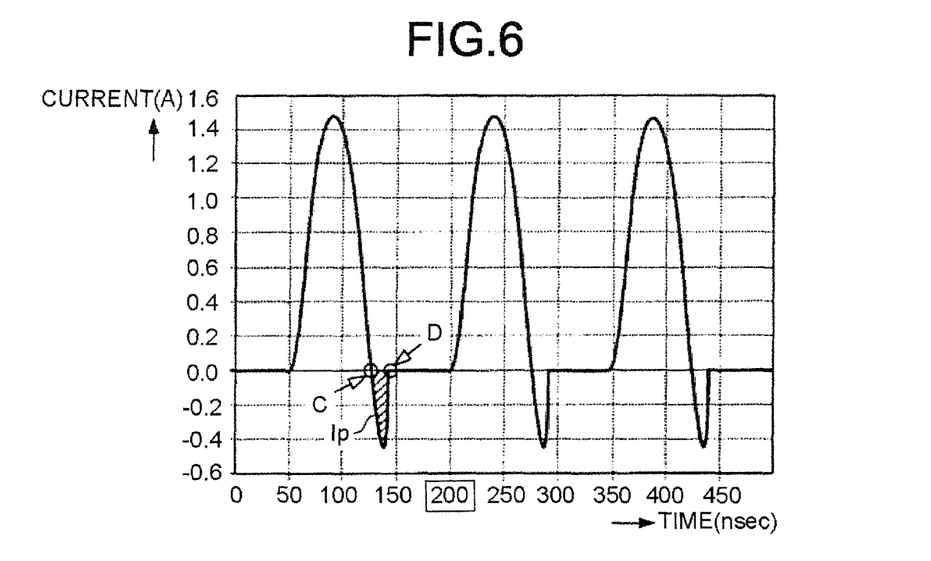
FIG. 6 is a simulation waveform diagram of the conduction current of a diode of the diode full-wave rectifier circuit in a conventional non-contact power reception apparatus.

FIG. 6 illustrates a simulation waveform of the conduction current of the diode 41 of the diode full-wave rectifier circuit 24 in a conventional non-contact power reception apparatus.

FIG. 6 illustrates the simulation waveform of the conduction current of the diode 41 in a circuit in which in the configuration of FIG. 2, the common mode filter 25 is removed, the output end 243 of the diode full-wave rectifier circuit 24 is directly connected with one end of the smoothing capacitor 26, and the reference potential end 244 is directly connected with the other end of the smoothing capacitor 26. In FIG. 6, the horizontal axis represents the time, and the vertical axis represents the current. The frequency of the AC power received by the power reception coil 21 is 6.78 MHz.

For example, a case in which the junction capacitance Cj of the diode 41 used in the simulation is assumed as 740 pF is described. The AC power received by the power reception coil 21 is converted to the DC power with the diode full-wave rectifier circuit 24. At the time the AC power changes from the positive cycle to the negative cycle, the conduction current of the diode 41 flows from the cathode to the anode. At this time, as there is no common mode filter 25, the conduction current flows without being suppressed.

In the simulation waveform shown in FIG. 6, a point C is a point of switching from a state in which the conduction current of the diode 41 flows from the anode to the cathode to a state in which the conduction current flows from the cathode to the anode. A point D is a point of switching from a state in which the conduction current of the diode 41 flows from the cathode to the anode to a state in which the conduction current flows from the anode to the cathode.

In FIG. 6, in just 15 ns between the point C and the point D, a peak current (Ip) of 0.45 A flows. The peak current causes generation of a harmonic wave in the alternating voltage of the power reception coil 21. Therefore, the power reception apparatus of the embodiment can reduce the generation of the harmonic noise.

Next, a measurement result by an actual machine is described with reference to table 1.

TABLE 1

| | HARMONIC FREQUENCY | | |
|---|---|---|---|
| | 20.34 MHZ | 47.47 MHz | 155.94 MHz |
| EMBODIMENT | −78 dBm | −83 dBm | −91 dBm |
| COMPARISON EXAMPLE | −68 dBm | −65 dBm | −68 dBm |
| DIFFERENCE | 10 dB | 18 dB | 23 dB |

The table 1 illustrates the result obtained by experimenting on the non-contact power reception apparatus of the embodiment and the actual machine equivalent to the conventional power reception apparatus as a comparison example to easily measure a noise level radiated from the individual power reception apparatus. The actual machine equivalent to the conventional power reception apparatus is the configuration obtained by removing the common mode filter 25 from the power reception apparatus of the embodiment.

The table 1 illustrates the result obtained by measuring noise levels of harmonic frequencies (3 times, 7 times and 23 times as many as the fundamental frequency) at the time the frequency 6.78 MHz of the received AC power is set as the fundamental frequency in the embodiment and the conventional power reception apparatus (comparison example) to calculate reduction amounts according to differences of values. As shown in the table 1, the reduction amount of the noise level of the tertiary harmonic wave (20.34 MHz) is calculated as follows: with respect to that the noise level of the power reception apparatus of the embodiment is −78 dBm, the noise level of the power reception apparatus of the comparison example is −68 dBm, and thus the noise level of the embodiment is reduced by 10 dB.

Similarly, in the seventh harmonic wave (47.46 MHz), with respect to that the noise level of the embodiment is −83 dBm, the noise level of the comparison example is −65 dBm, and thus the noise level of the embodiment is reduced by 18 dB. Furthermore, in the twenty-third harmonic wave (155.94 MHz), with respect to that the noise level of the embodiment is −91 dBm, the noise level of the comparison example is −68 dBm, and thus it can be confirmed that the noise level of the embodiment is reduced by 23 dB.

As stated above, according to the first embodiment, the harmonic noise level can be reduced.

Second Embodiment

Next, the configuration of a non-contact power reception apparatus according to the second embodiment is described with reference to FIG. 7.

Figure 7:
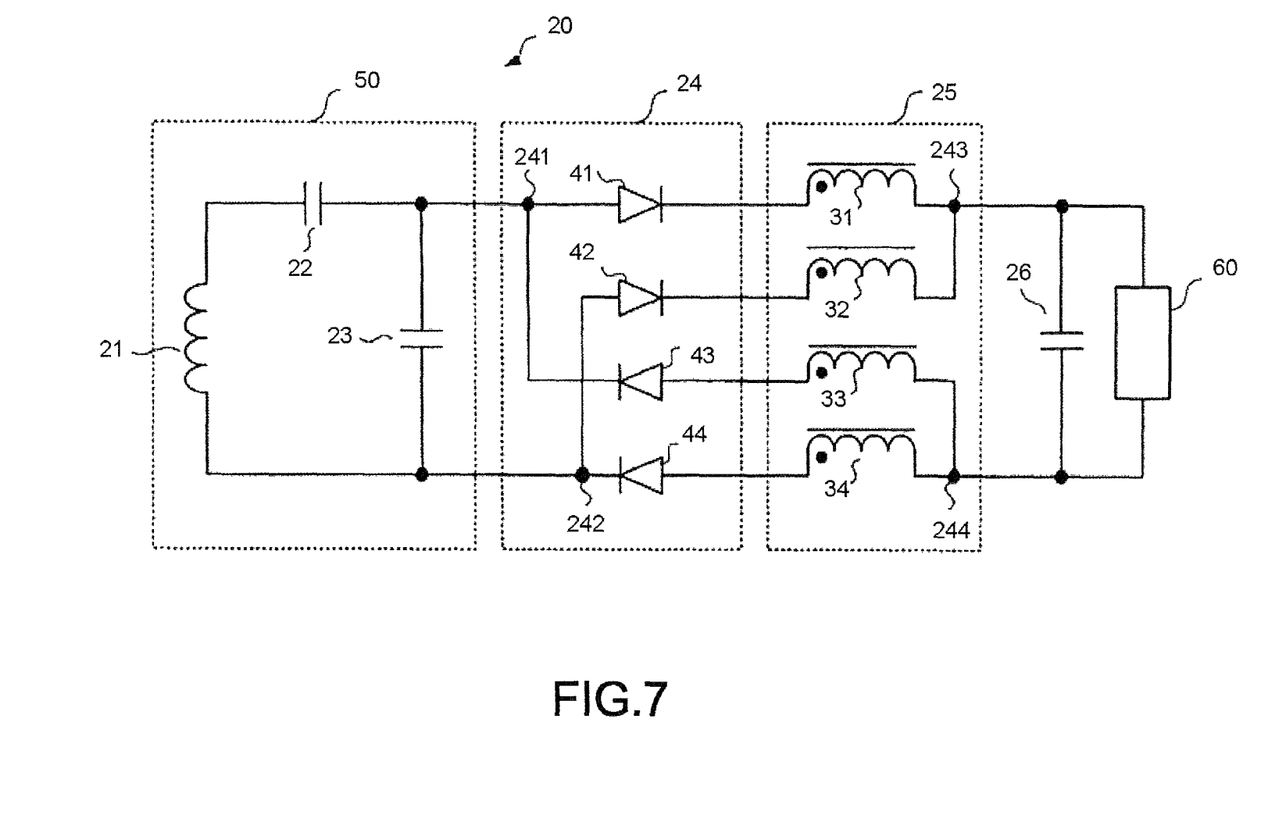
FIG. 7 is a circuit diagram illustrating the configuration of a non-contact power reception apparatus according to a second embodiment.

The power reception apparatus 20 in FIG. 7 is an example of using a common mode filter in which four coils 31, 32, 33 and 34 are wound around one core in the same direction for only the same number of turns as the common mode filter 25. In FIG. 7, the AC power from the resonance circuit is input to the input ends 241 and 242 of the diode full-wave rectifier circuit 24, the DC power is output between the output end 243 and the reference potential end 244 of the diode full-wave rectifier circuit 24, and the primary coil 31 and the secondary coil 32 of the common mode filter 25 are respectively arranged in a current path between the cathode of the diode 41 and the output end 243 and in a current path between the cathode of the diode 42 and the output end 243.

Further, a tertiary coil 33 and a quartic coil 34 of the common mode filter 25 are respectively arranged in a current path between the anode of the diode 43 and the reference potential end 244 and in a current path between the anode of the diode 44 and the reference potential end 244. The smoothing capacitor 26 is connected between the output end 243 and the reference potential end 244.

The configuration of the power reception apparatus 20 in FIG. 7 is identical to that in FIG. 2 except that the four coils are arranged in the common mode filter 25, and the same functions and effects as the embodiment in FIG. 2 are obtained.

Third Embodiment

Next, the configurations of a non-contact power reception apparatus according to the third embodiment are described with reference to FIG. 8, FIG. 9 and FIG. 10.

Figure 8:
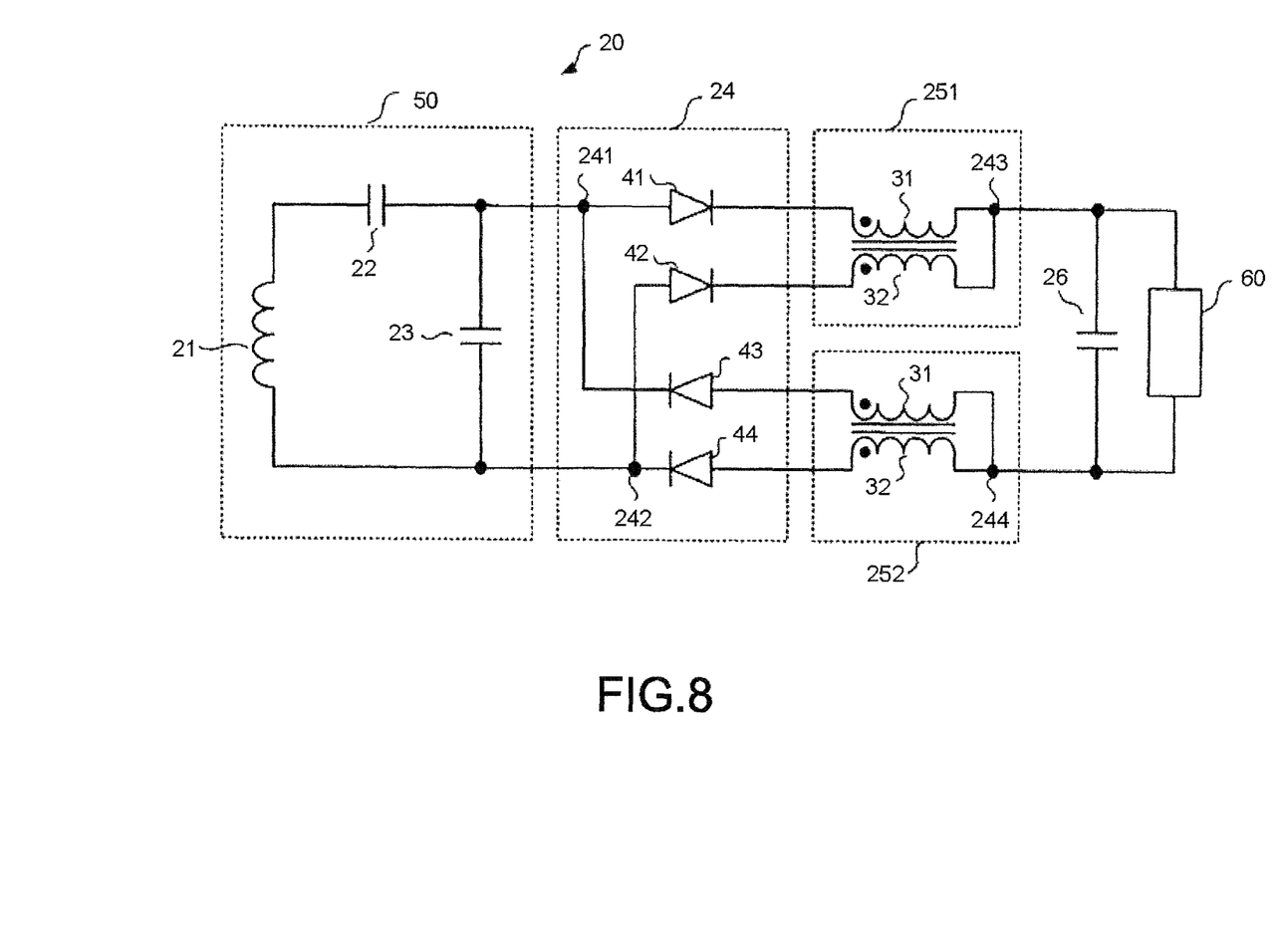
FIG. 8 is a circuit diagram illustrating the configuration of a non-contact power reception apparatus according to a third embodiment.

The power reception apparatus 20 in FIG. 8 inputs the AC power from the resonance circuit to the input ends 241 and 242 of the diode full-wave rectifier circuit 24, outputs the DC power between the output end 243 and the reference potential end 244 of the diode full-wave rectifier circuit 24, and respectively arranges the primary coil 31 and the secondary coil 32 of the common mode filter 251 in a current path between the cathode of the diode 41 and the output end 243 and in a current path between the cathode of the diode 42 and the output end 243.

Further, the primary coil 31 and the secondary coil 32 of the common mode filter 252 are respectively arranged in a current path between the anode of the diode 43 and the reference potential end 244 and in a current path between the anode of the diode 44 and the reference potential end 244. The smoothing capacitor 26 is connected between the output end 243 and the reference potential end 244.

In other words, in the power reception apparatus 20 in FIG. 8, two common mode filters 25 with the configuration in FIG. 2 are arranged, and respectively divided for the diodes 41 and 42 and the diodes 43 and 44. The configuration in FIG. 8 is identical to that in FIG. 2 except that the two common mode filters 25 are arranged, and the same functions and effects as the embodiment in FIG. 2 are obtained.

Figure 9:
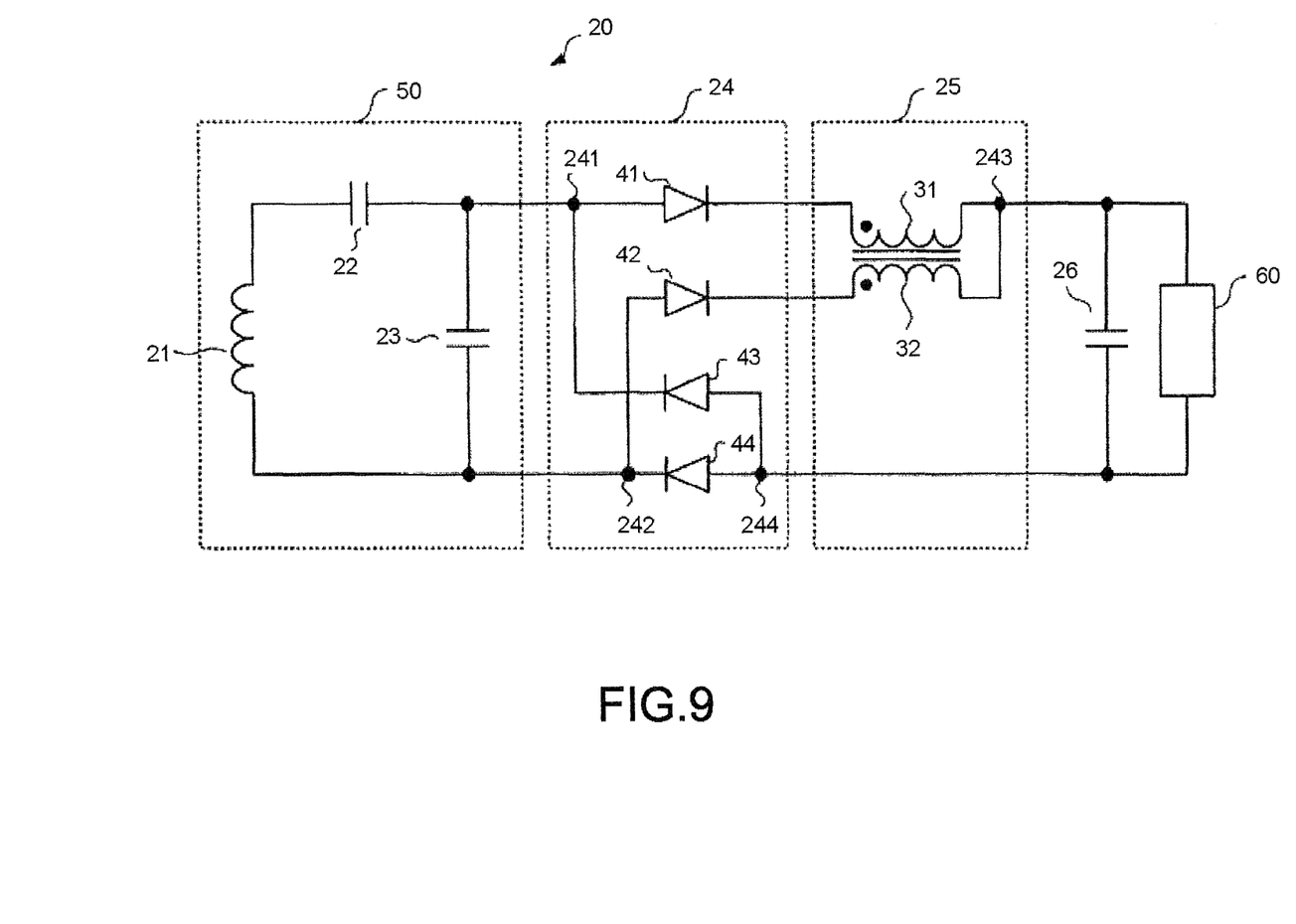
FIG. 9 is a circuit diagram illustrating another configuration of the non-contact power reception apparatus according to the third embodiment.

The power reception apparatus 20 in FIG. 9 inputs the AC power from the resonance circuit to the input ends 241 and 242 of the diode full-wave rectifier circuit 24, outputs the DC power between the output end 243 and the reference potential end 244 of the diode full-wave rectifier circuit 24, and arranges the primary coil 31 and the secondary coil 32 of the common mode filter 25 in current paths between the cathodes of the diodes 41 and 42 and the output end 243. Further, the anodes of the diodes 43 and 44 are connected with the reference potential end 244, and the smoothing capacitor 26 is connected between the output end 243 and the reference potential end 244.

In other words, in the power reception apparatus 20 in FIG. 9, with respect to the configuration in FIG. 8, the common mode filter 25 is arranged only for the diodes 41 and 42. The common mode filter 25 acts on the diodes 41 and 42, and thus does not operate as the differential mode; however, the common mode filter 25 acts as a choke coil, and thus the suppression effect of the harmonic wave is obtained.

The harmonic noise is not completely suppressed, transmitted to the wiring (power line or ground line) to go round to the signal line, and thus there is a possibility that the harmonic noise appears as the common mode noise; however, as shown by the characteristic B in FIG. 4, as the impedance in the common mode of the common mode filter 25 is sufficiently high, the common mode noise can be suppressed. From the point that the common mode filter 25 is not arranged for the diodes 43 and 44, compared with the configuration in FIG. 8, the suppression force of the harmonic noise is slightly poor but effective.

Figure 10:
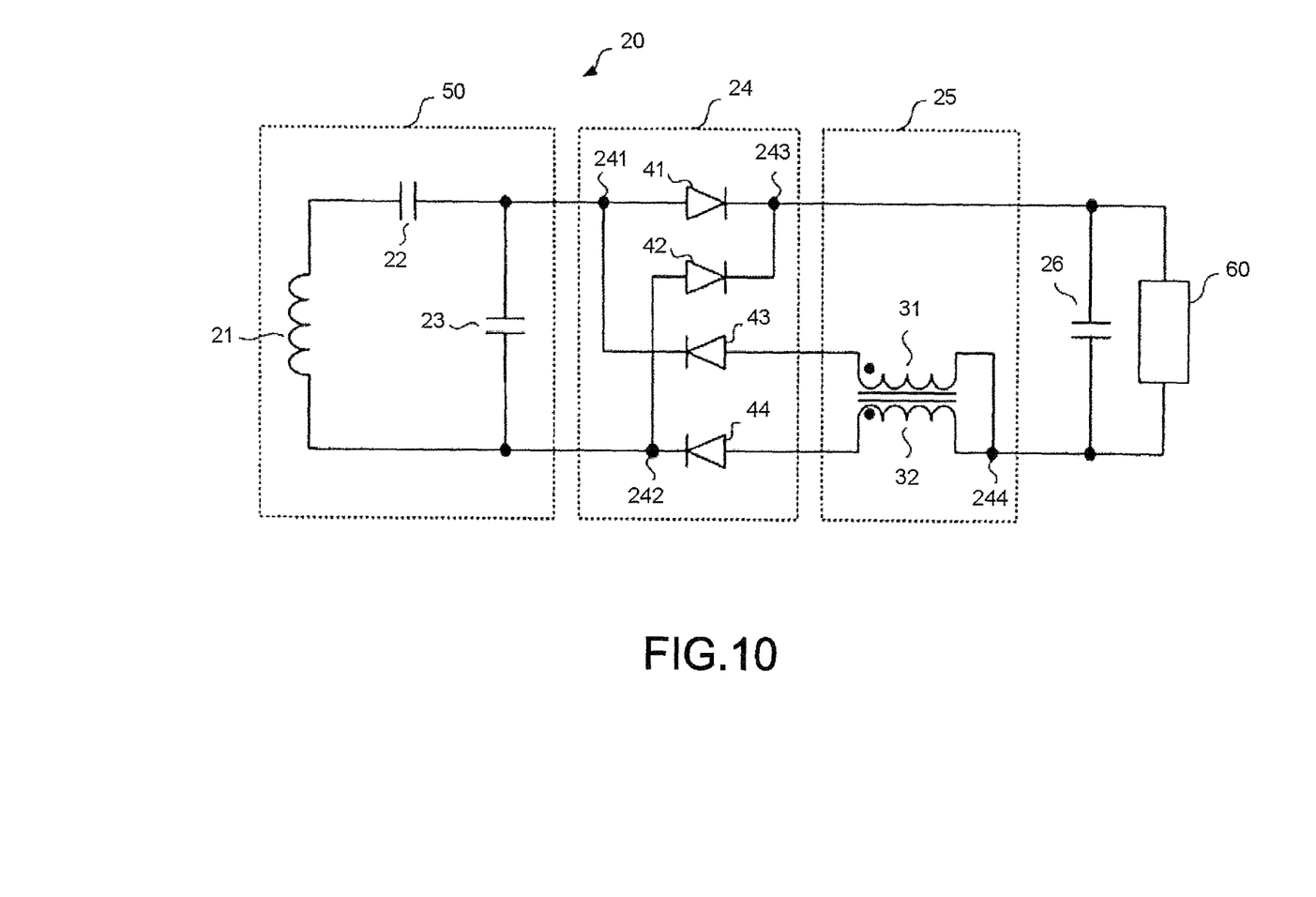
FIG. 10 is a circuit diagram illustrating yet another configuration of the non-contact power reception apparatus according to the third embodiment.

The power reception apparatus 20 in FIG. 10 inputs the AC power from the resonance circuit to the input ends 241 and 242 of the diode full-wave rectifier circuit 24, outputs the DC power between the output end 243 and the reference potential end 244 of the diode full-wave rectifier circuit 24, and arranges the primary coil 31 and the secondary coil 32 of the common mode filter 25 in current paths between the anodes of the diodes 43 and 44 and the reference potential end 244. Further, the cathodes of the diodes 41 and 42 are connected with the output end 243, and the smoothing capacitor 26 is connected between the output end 243 and the reference potential end 244.

In other words, in the power reception apparatus 20 in FIG. 10, with respect to the configuration in FIG. 8, the common mode filter 25 is arranged only for the diodes 43 and 44. Similar to the configuration in FIG. 9, the common mode filter 25 acts as the choke coil, and thus the suppression effect of the harmonic wave is obtained. Further, the common mode noise can be suppressed.

At the time of producing the non-contact power supply system, it is necessary to meet a regulation value for the radiation noise or the conduction noise (EMI) in each country. Considering the regulation value at a frequency of 30 MHz or less regulated by the conduction noise and the like, the regulation value is loose as 6.78 MHz serving as the switching frequency is an ISM (Industry-Science-Medical) frequency internationally. Further, the regulation value is loose as 13.56 MHz which is twice as much as 6.78 MHz and 27.12 MHz which is four times as much as 6.78 MHz are also the ISM frequencies. On the other hand, as 20.34 MHz of a harmonic wave which is three times as much as 6.78 MHz is not the ISM frequency, it is necessary to suppress the conduction noise and the radiation noise low, and the configuration of the present embodiment is an effective module for noise reduction.

The noise radiated from the power transmission apparatus 10 is especially radiated from the power transmission coil 11; however, as the noise is also radiated from the power reception coil 21 at the time of power transmission, it is necessary to remove harmonic distortion from the power applied to the power reception coil 21. According to the configuration shown in the embodiment, it is possible that not only the tertiary harmonic wave and the seventh harmonic wave, but also another higher-order harmonic component is also largely attenuated, and there is an effect on the noise reduction.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A non-contact power reception apparatus, comprising:
a power reception coil configured to receive AC power supplied from a power transmission apparatus in a non-contact manner;
a resonance circuit configured to comprise the power reception coil and a capacitor for resonance and resonate at a frequency of the AC power;
a diode full-wave rectifier circuit configured to input AC power from the resonance circuit to first and second input ends and output DC power between an output end and a reference potential end;
a common mode filter configured to comprise first to fourth coils wound around a common magnetic body in parallel in the same direction for only the same number of turns, arrange the first coil and the second coil in current paths between the output end and cathodes of first and second diodes of which anodes are respectively connected with the first and second input ends in the diode full-wave rectifier circuit, and arrange the third coil and the fourth coil in current paths between the reference potential end and anodes of third and fourth diodes of which cathodes are respectively connected with the first and second input ends in the diode full-wave rectifier circuit;
a smoothing capacitor connected between the output end and the reference potential end; and
a load connected with the smoothing capacitor in parallel.

2. The non-contact power reception apparatus according to claim 1 wherein the load is a battery of an electronic device.

3. The non-contact power reception apparatus according to claim 1, wherein the first to fourth coils comprise a split winding.

4. The non-contact power reception apparatus according to claim 3, wherein the first to fourth coils are separately wound on an outer periphery of a core.

5. The non-contact power reception apparatus according to claim 1, wherein the first to fourth coils comprise a bifilar winding.

6. A non-contact power reception apparatus, comprising:
a power reception coil configured to receive AC power supplied from a power transmission apparatus in a non-contact manner;
a resonance circuit configured to comprise the power reception coil and a capacitor for resonance and resonate at a frequency of the AC power;
a diode full-wave rectifier circuit configured to input AC power from the resonance circuit to a first input end and a second input end and output DC power between an output end and a reference potential end;
a common mode filter configured to comprise at least one of:
a first coil and a second coil wound around a first common magnetic body in parallel in the same direction for only the same number of turns, arrange the first coil and the second coil in respective first current paths between the output end and a first cathode of a first diode and a second cathode of a second diode of which a first anode of the first diode and a second anode of the second diode are respectively connected with the first input end and the second input end in the diode full-wave rectifier circuit; and a third coil and a fourth coil wound around a second common magnetic body in parallel in the same direction for only the same number of turns, arrange the third coil and the fourth coil in respective second current paths between the reference potential end and a third anode of a third diode and a fourth anode of a fourth diode of which a third cathode of the third diode and a fourth cathode of the fourth diode are respectively connected with the first input end and the second input end in the diode full-wave rectifier circuit;

a smoothing capacitor connected between the output end and the reference potential end; and a load connected with the smoothing capacitor in parallel.

7. The non-contact power reception apparatus according to claim 6, wherein the common mode filter comprises the first coil and the second coil.

8. The non-contact power reception apparatus according to claim 6, wherein the common mode filter comprises the third coil and the fourth coil.

9. The non-contact power reception apparatus according to claim 6, wherein the common mode filter comprises the first coil, the second coil, the third coil, and the fourth coil.

10. The non-contact power reception apparatus according to claim 6, wherein the load is a battery of an electronic device.

11. The non-contact power reception apparatus according to claim 6, wherein the first coil and the second coil comprise a split winding.

12. The non-contact power reception apparatus according to claim 11, wherein the first coil and the second coil are separately wound on an outer periphery of a core.

13. The non-contact power reception apparatus according to claim 6, wherein the third coil and the fourth coil comprise a split winding.

14. The non-contact power reception apparatus according to claim 13, wherein the third coil and the fourth coil are separately wound on an outer periphery of a core.

15. The non-contact power reception apparatus according to claim 6, wherein the first coil and the second coil comprise a bifilar winding.

* * * * *